United States Patent
Atkins et al.

Patent Number: 6,118,641
Date of Patent: Sep. 12, 2000

[54] OVERCURRENT PROTECTION DEVICE

[75] Inventors: Ian Paul Atkins, Swindon; David Mansel Williams, Oxon; Dennis Malcolm Pryor, Swindon, all of United Kingdom

[73] Assignee: Raychem Limited, Dorcan Swindon, United Kingdom

[21] Appl. No.: 08/084,255

[22] PCT Filed: Jan. 7, 1992

[86] PCT No.: PCT/GB92/00027

§ 371 Date: Jul. 7, 1993

§ 102(e) Date: Jul. 7, 1993

[87] PCT Pub. No.: WO92/12561

PCT Pub. Date: Jul. 23, 1992

[30] Foreign Application Priority Data

Jan. 7, 1991 [GB] United Kingdom ............ 9100283

[51] Int. Cl.⁷ .................................................. H02H 9/00
[52] U.S. Cl. ............................................................ 361/58
[58] Field of Search ............................... 361/18, 56, 58, 361/111, 118, 119, 71, 72, 86, 100; 323/265, 266, 270, 271, 273, 274, 276, 277–282, 284, 285, 908; 363/59, 60

[56] References Cited

U.S. PATENT DOCUMENTS

| | | | |
|---|---|---|---|
| 3,548,294 | 12/1970 | Houghton | 361/18 |
| 3,617,655 | 11/1971 | Fischer | 179/170.4 |
| 3,801,872 | 4/1974 | Zocholl et al. | 317/22 |
| 3,916,220 | 10/1975 | Roveti | 307/251 |
| 4,110,809 | 8/1978 | Cronin | 316/95 |
| 4,202,023 | 5/1980 | Sears | 361/18 |
| 4,241,372 | 12/1980 | Sears | 361/72 |
| 4,396,882 | 8/1983 | Kellenbenz | 323/278 |
| 4,423,457 | 12/1983 | Brajder | 361/86 |
| 4,491,892 | 1/1985 | Lehmann et al. | 361/101 |
| 4,513,343 | 4/1985 | Ryczek | 361/101 |
| 4,533,970 | 8/1985 | Brown | 361/58 |
| 4,536,699 | 8/1985 | Baker | 323/276 |
| 4,594,633 | 6/1986 | Townsend et al. | 361/57 |
| 4,603,234 | 7/1986 | Huet et al. | 179/16 AA |
| 4,604,674 | 8/1986 | Hamel | 361/73 |
| 4,661,879 | 4/1987 | Sato et al. | 361/58 |
| 4,723,190 | 2/1988 | Chung | 361/91 |

(List continued on next page.)

FOREIGN PATENT DOCUMENTS

| | | | |
|---|---|---|---|
| A-17771/88 | 12/1989 | Australia | H02H 9/02 |
| 147818 | 7/1985 | European Pat. Off. | H02H 3/02 |
| 252541 | 1/1988 | European Pat. Off. | H02H 3/087 |
| 356186 | 2/1990 | European Pat. Off. | H02H 9/02 |
| 2 564 261 | 11/1985 | France | H03K 17/04 |
| 2619262 | 2/1989 | France | H02H 9/02 |
| 1233475B | 2/1967 | Germany . | |

(List continued on next page.)

OTHER PUBLICATIONS

British Search Report, British Patent Application No. 9100283.2, filed Jan. 7, 1991.

(List continued on next page.)

*Primary Examiner*—Ronald W. Leja

[57] ABSTRACT

A two terminal circuit protection arrangement that: (1) is intended to be series connected in a line of the circuit; (2) comprises (a) a series switching transistor (1) that controls the line current, (b) a control transistor (4) that controls the base or gate voltage of the switching transistor and is responsive to an overcurrent through the switching transistor, and (c) a voltage source, for example a battery (3), a dc-dc converter (58/59) or a Seebeck device (43), applied to the base or gate of the switching transistor which biases the switching transistor into or toward conduction in normal operation; and (3) is capable of being remotely reset into a conducting state by stopping current in the line. The arrangement enables the initial voltage drop that is required to turn the switching transistor (1) on to be reduced or eliminated while requiring relatively little current from the voltage source. The arrangement can be reset remotely by briefly removing the voltage source or load from the circuit.

30 Claims, 2 Drawing Sheets

6,118,641
Page 2

U.S. PATENT DOCUMENTS

| | | | |
|---|---|---|---|
| 4,736,268 | 4/1988 | Wagoner | 361/111 |
| 4,744,369 | 5/1988 | Kroll | 128/696 |
| 4,771,357 | 9/1988 | Lorincz et al. | 361/87 |
| 4,799,126 | 1/1989 | Kruse et al. | 361/101 |
| 4,811,156 | 3/1989 | Kroll | 361/58 |
| 4,833,390 | 5/1989 | Kumada et al. | 320/2 |
| 4,835,649 | 5/1989 | Salerno | 361/18 |
| 4,853,820 | 8/1989 | Ham et al. | 361/59 |
| 4,937,697 | 6/1990 | Edwards et al. | 361/18 |
| 5,095,261 | 3/1992 | Schoofs | 323/222 |

FOREIGN PATENT DOCUMENTS

| | | | |
|---|---|---|---|
| 2147471 | 7/1973 | Germany | H02H 7/20 |
| 2431167A | 1/1976 | Germany | H02H 7/22 |
| 2440947A | 3/1976 | Germany | G05F 1/58 |
| 3204338 | 3/1976 | Germany | H02H 7/20 |
| 2811696 | 9/1979 | Germany | H03K 17/60 |
| 3433538A | 3/1986 | Germany | G05F 1/569 |
| 3705177 | 6/1987 | Germany | H02H 3/08 |
| 3725390 | 2/1989 | Germany | H02H 3/08 |
| 276572 | 9/1990 | Germany | H02H 7/00 |
| 57-129125 | 8/1992 | Japan | H02H 3/46 |
| 107500 | 1/1989 | Taiwan | H02H 3/00 |
| 148095 | 12/1990 | Taiwan | H02H 3/18 |
| 976862A | 12/1964 | United Kingdom | H02H 3/087 |
| 1157169A | 7/1969 | United Kingdom | H04B 3/36 |
| 1175895 | 1/1970 | United Kingdom | H03H 11/00 |
| 1467055A | 3/1977 | United Kingdom | H02H 3/08 |
| 1481458A | 7/1977 | United Kingdom | H03K 17/08 |
| 1497690A | 1/1978 | United Kingdom | H02H 7/20 |
| 2145593A | 3/1985 | United Kingdom | H02H 3/087 |
| 2167915A | 6/1986 | United Kingdom | H02H 3/22 |
| 2208193 | 3/1989 | United Kingdom | H02H 3/08 |
| 2230665A | 10/1990 | United Kingdom | H02H 3/08 |
| WO/8603079 | 5/1986 | WIPO | H03K 17/687 |
| WO/92/07403 | 4/1992 | WIPO | H02H 3/087 |

OTHER PUBLICATIONS

International Search Report, International Application No. PCT/GB92/00027, filed Jan. 7, 1992.

International Search Report for PCT/GB92/00027 dated Nov. 13, 1992.

"Using UC3840 in Designing a Switching Power Supply", *Collection of Transistor Circuit Manufacturing*, pp. 150–161. No Date.

"Various Types of Power Supply Protection Circuits", *Switching Power Supply Units*, Chapter 8, (pp. 209–229). No Date.

British Search Report, Application No. 9022236.5, filed Oct. 12, 1990.

British Search Report, Application No. 9022237.3, filed Oct. 12, 1990.

British Search Report, Application No. 9022261.3, filed Oct. 12, 1990.

British Search Report, Application No. 9027111.5, dated Mar. 26, 1991.

British Search Report, Application No. 9100283.2, filed Jan. 7, 1991.

British Search Report, Application No. 9114717.3, filed Jul. 8, 1991.

British Search Report, Application No. 9120727.4, filed Sep. 30, 1991.

Erich Gelder and Walter Hirschmann, Siemens Fachbucher, Circuits with Semiconductor Components, vol. 4, pp. 199–202, 1970; a translation of this document is attached. No Month.

Horst van Pelka, *Siemens–Bauteile–Informationen*, vol. 4, No. 6, 1968, p. 106 (right col.). No Month.

International Search Report, Application No. PCT/GB91/01760, filed Oct.10, 1991.

International Search Report, Application No. PCT/GB91/01761, filed Oct. 10, 1991.

International Search Report, Application No. PCT/GB91/02215, filed Dec. 12, 1991.

International Search Report, Application No. PCT/GB92/00027, filed Jan. 7, 1992.

International Search Report, Application No. PCT/GB92/01237, filed Aug. 8, 1992.

International Search Report, Application No. PCT/GB92/01739, filed Sep. 22, 1992.

OVERCURRENT PROTECTION DEVICE

This invention relates to arrangements for protecting electrical circuits from overcurrents, for example from overcurrents caused by equipment faults, electrostatic discharge or other threats, and to circuits thus protected.

One circuit protection arrangement of relatively simple form is described in German Patent Application No. 37 25 390 dated Jul. 31, 1987 to Wickmann-Werke GmbH. This arrangement comprises a series switching transistor that controls the circuit current and a control transistor that controls the base or gate voltage of the switching transistor. The base or gate voltage of the control transistor is set by a voltage divider that spans the switching transistor, so that, if the arrangement experiences an overcurrent, the control transistor will be biased into conduction and will turn the switching transistor off. Although this arrangement is particularly simple, it suffers from the disadvantage that in normal operation there will always be a significant voltage drop across the arrangement before it will conduct current, this voltage drop being due to the base-emitter junction voltage of the switching transistor added to the voltage drop across the base resistor in the case of bipolar arrangements. In the case of arrangements based on enhancement mode FETs, the voltage drop will be due to the threshold voltage of the switching transistor. The voltage drop prevents this form of circuit protection arrangement being used in a number of applications and can lead to heat generation problems in high current applications.

Another circuit protection arrangement is described in German patent application No. 37 05 177 dated Feb. 18, 1987 to Siemens AG. This arrangement includes a power MOSFET in a line of the circuit, the gate of the MOSFET being biased on by a battery. A thyristor is connected between the gate of the transistor and the circuit line on the source side of the transistor and senses the voltage drop in the line across a resistor connected in series with the MOSFET. When the voltage drop across the resistor is greater than 0.7V the thyristor fires and the MOSFET is switched off. This circuit has the advantage that there is no initial voltage drop before current can flow through the MOSFET. However, once the arrangement has switched into its blocking state it will remain latched in that state and can be reset to its conducting state only by means of a switch that shorts the anode and cathode of the thyristor. Furthermore, the battery needs to be able to supply a current in the order of 1mA to maintain the thyristor in its on state the whole time from when the arrangement trips to its blocking state until it is manually reset.

According to the present invention, there is provided a two terminal circuit protection arrangement that: (1) is intended to be series connected in a line of the circuit; (2) comprises: (a) a series switching transistor that controls the line current; (b) and a control transistor that controls the base or gate voltage of the switching transistor and is responsive to an overcurrent through the switching transistor; and (c) the arrangement including a voltage source applied to the base or gate of the switching transistor which biases the switching transistor into or toward conduction in normal operation; (3) is being capable of being remotely reset into a conducting state by stopping current in the line.

The arrangement according to the invention has the advantage that it is possible to form an arrangement that reduces, or even eliminates the initial voltage drop across the switching transistor before it conducts, while at the same time drawing a relatively low current from the voltage source under all conditions. Furthermore, it is possible to reset the arrangement remotely for example by briefly removing the source or the load. As soon as the source or load is removed the arrangement will reset itself to its low resistance state.

Because the initial voltage drop can be reduced or eliminated it is possible, in normal operation, for the only voltage drop across the switching transistor to be due to its collector resistance or its channel resistance. The voltage source may have any value up to or even higher than that required to bias the switching transistor into conduction, the initial voltage drop across the switching transistor reducing as the voltage source potential rises.

The voltage source may be provided by any of a number of devices the particular choice depending on a number of factors including the current that will be drawn from the voltage source. For example, it may comprise a battery. The battery will be in series with the control transistor and a resistor (the value of which determines at least partly the leakage current of the arrangement). This resistor can have a relatively high value, for example 1 MΩ or more, often 10 MΩ or more, in which case the maximum current that will be drawn from the battery will be in the order of 5 μA and preferably in the order of 500 nA or less when the arrangement has tripped. In the normal state of the arrangement when the control transistor is off the current drawn from the battery will usually be in the order of picoamps, eg. less than 100 pA. Thus, the battery may be formed as a small lithium cell having only a very small capacity, eg. in the order of 1mAh which can be incorporated into an integrated circuit package and will have a lifetime of a number of years. The voltage source is preferably connected in series with a current limiting resistor, especially where a battery is employed, in order to prevent discharging of the battery when an overcurrent is experienced and the control transistor is turned on.

Another form of voltage source that may be employed is a thermoelectric device such as a Seebeck device. Such a device is advantageously located in thermal contact with the switching transistor so that heat generated by the switching transistor flows through the device. This arrangement has the advantage that the thermoelectric device provides a feedback arrangement in which an increase in heat generation in the switching transistor caused by the voltage drop across the switching transistor increases the base or gate offset voltage and so reduces the voltage drop. For relatively low frequency changes in the circuit current, this feedback can effectively reduce the switching transistor channel resistance.

Yet another voltage source that can be used is a dc-dc voltage converter. Such converters are two-port networks which take a low voltage dc input and produce a higher dc voltage output. The converter may be used to increase the voltage from another voltage source such as a Seebeck device mentioned above, or it may be connected across the switching transistor so that the voltage drop across the switching transistor is multiplied and fed into its base or gate.

Other forms of voltage source that may be employed include photovoltaic devices and capacitors that are charged up, for example by voltage multiplication or by top-up charging when the switching transistor is off. Alternatively, a separate supply may be employed for the voltage source, for example a rectified mains supply.

If desired the base or gate voltage of the control transistor may be determined by a voltage divider that spans the switching transistor so that the trip current of the arrangement is determined by the switching transistor channel resistance and the proportion of the voltage drop across the switching transistor that is fed into the gate of the control transistor. Alternatively, the base or gate of the control transistor may be connected directly to the collector or drain of the switching transistor so that the arrangement will trip if the overcurrent voltage drop across the switching transistor exceeds the turn-on voltage of the control transistor.

Where the arrangement is intended to be employed with ac circuits, it may be connected to the line via a rectifying bridge circuit. Alternatively a pair of equivalent circuit protection arrangements according to the invention may be employed, the two arrangements handling different cycles of the ac signal. This latter arrangement has the advantage that the overall voltage drop across the arrangement is reduced due to a reduction in the number of diodes employed.

The overcurrent protection arrangement may employ either bipolar junction transistor or field effect transistors, although FETs are preferred since a bipolar switching transistor will require a significant base current to be provided by the voltage source. In addition, the term "transistor" includes circuit elements employing more than one transistor that can emulate the switching properties of a transistor, for example a number of transistors in a Darlington configuration. In the case of bipolar arrangements, Darlington configurations are preferred in order to reduce the switching transistor base current. Not only does this base current load the voltage source, but it must be supplied via a resistor connected between the base and collector of the switching transistor. When the circuit switches to its blocking state the switching transistor base current is diverted through the control transistor (which is now on) and becomes a leakage current. However, since the voltage drop across the resistor is much higher when the arrangement is in its blocking state, the leakage current is larger than the switching transistor base current. If a Darlington pair or triplet is employed as the switching transistor, the effective dc current gain will be increased considerably so that a much higher resistance can be used.

A bipolar control transistor may advantageously be employed in conjunction with a field effect switching transistor. This arrangement has the advantage that the trip voltage is reduced to a pn junction voltage drop, thereby allowing a switching transistor having a lower channel resistance to be used with a consequent reduction of power dissipation.

Where field effect transistors are employed, enhancement mode MOSFETs should be employed. The arrangement may be produced as an integrated circuit, in which case the resistors employed in the switching circuit may be provided by MOSFETs, for example with their gates and drains connected as in nMOS logic. Alternatively, the current limiting resistor may be replaced by a further FET that forms a complementary pair with the control transistor.

According to a further aspect, the invention provides an electrical circuit which comprises a circuit voltage or current supply, a load and a current-carrying line connecting the supply and load, the circuit including a two terminal circuit protection arrangement that: (1) is series connected in the current-carrying line; (2) comprises: (a) a series switching transistor that controls the line current; (b) a control transistor that controls the base or gate voltage of the switching transistor and is responsive to an overcurrent through the switching transistor; and (c) a voltage source applied to the base or gate of the switching transistor which biases the switching transistor into or toward conduction in normal operation; and (3) is capable of being remotely reset into a conducting state by removing the circuit voltage or current source or the load.

Several forms of arrangement in accordance with the present invention will now be described by way of example with reference to the accompanying drawings in which.

Figure 1:
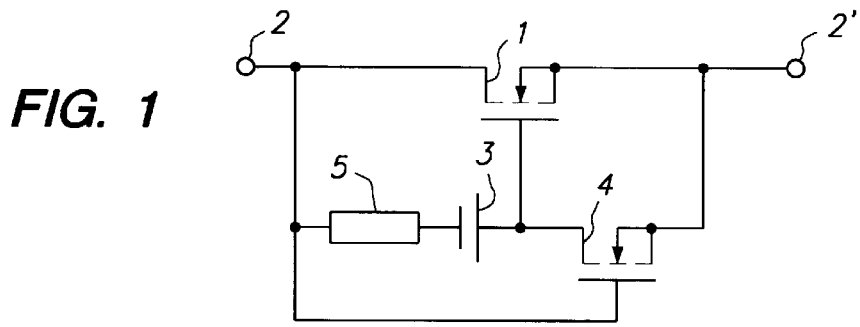
FIGS. 1 and 7 are circuit diagrams of the circuit protection arrangement according to the invention.

Referring to the accompanying drawings, the circuit of a two-terminal arrangement for protecting a circuit from an overcurrent is shown in FIG. 1. The arrangement comprises an n-channel enhancement mode switching MOSFET 1 that is connected between the terminals 2 and 2' of the device so that it passes the entire circuit current. The gate of switching transistor 1 is connected to its drain via battery 3 which offsets the gate voltage from the drain by the battery voltage and current limiting resistor 5.

An enhancement mode control MOSFET 4 is connected across the gate source junction of the switching transistor 1 in order to switch the switching transistor off when an overcurrent is experienced, the gate of the control transistor being connected directly to the drain of the switching transistor 1.

Figure 2:
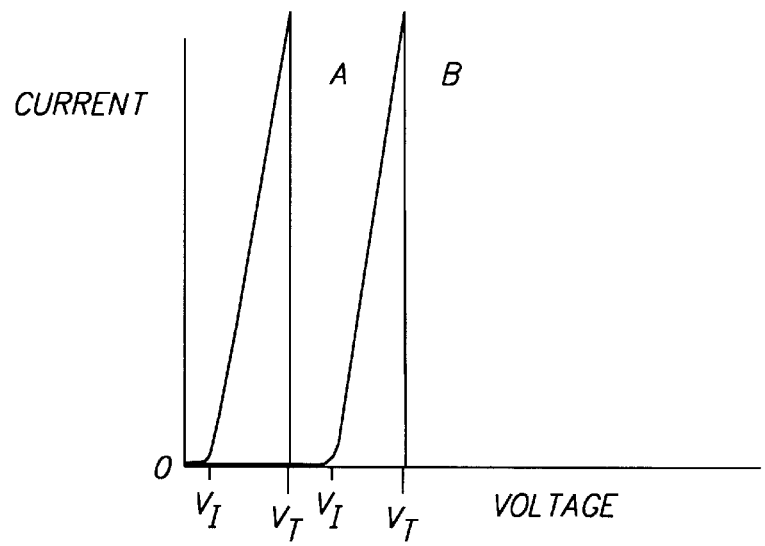
FIG. 2 is a graph showing the I–V characteristics of the circuit of FIG. 1 and of the prior art (DE 37 25 390)

In normal operation of the circuit, if there is no current in the line, the switching transistor 1 will be on or off depending on whether battery 3 offsets the transistor gate by more or less than the threshold voltage of the transistor. When the line is loaded the voltage across the switching transistor 1 will increase as the current increases as shown in FIG. 2 curve A, the slope of the curve depending on the switching transistor channel resistance. The voltage will continue to rise with increasing loading of the circuit until the trip voltage $V_T$ is reached at which point drain source voltage of the switching transistor 1 is equal to the threshold voltage of the control transistor 4, and the control transistor "shorts" the gate and source terminals of the switching transistor.

Once the arrangement has switched it will remain latched in its high resistance state even after the overcurrent has subsided because the resistance of transistor 1 is such that the entire circuit voltage is dropped across it. Thus, the arrangement must be disconnected from the circuit supply or load before it will reset itself. Current limiting resistor 5 prevents rapid draining of the battery 3 when the arrangement has tripped.

By way of comparison the I–V characteristic of a protection arrangement in accordance with German Application No. P 37 25 390 (employing FETs) is shown as curve B. This curve has the same form as curve A but is offset to a higher voltage drop. This is due to the fact that an initial voltage drop $V_I$ must occur across the switching transistor before the gate of the control transistor reaches the threshold voltage. The I–V characteristic of a protection arrangement in accordance with German Application No. P 37 05 177 is similar to that of the present invention (curve A) until an overcurrent occurs, whereupon the device latches in its high resistance state with the I–V curve lying on the voltage axis until manually reset.

Figure 3:
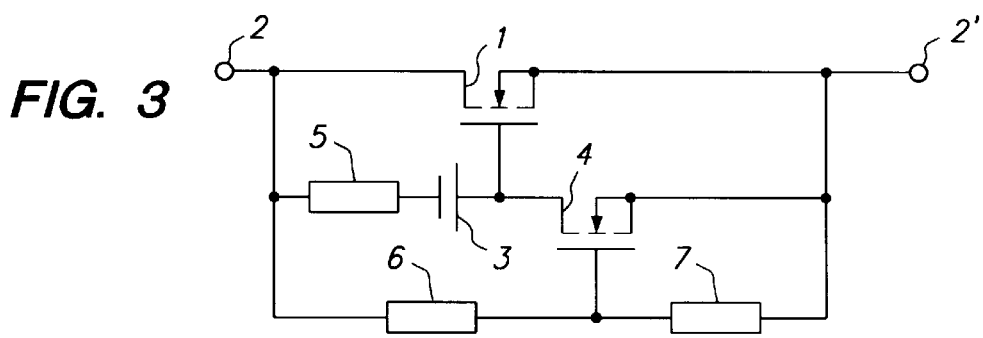
FIG. 3 is a circuit diagram of an alternative form of arrangement according to the invention.

FIG. 3 shows an alternative form of two terminal protection arrangement in which an enhancement mode MOSFET 1 passes the operating current of the circuit. The gate of switching transistor 1 is connected to its drain via a battery 3 (eg. about 1.5V) and 1 Mohm current limiting resistor 5, and a control MOSFET 4 is connected across the gate-source junction of transistor 1, as described with reference to FIG. 1. However, in this circuit the gate voltage of the control transistor 4 is held by a voltage divider formed from 1 Mohm resistance 6 and 1.22 Mohm resistance 7 which span the switching transistor. In operation this arrangement will perform in the same manner as that shown in FIG. 1 with the exception that the magnitude of the current required to cause it to switch is determined by the potential divider resistors 6 and 7 in addition to the threshold voltage of transistor 4 and channel resistance of switching transistor.

If desired, the battery can be connected between the gate and source of the switching transistor provided its polarity is changed.

Figure 4:
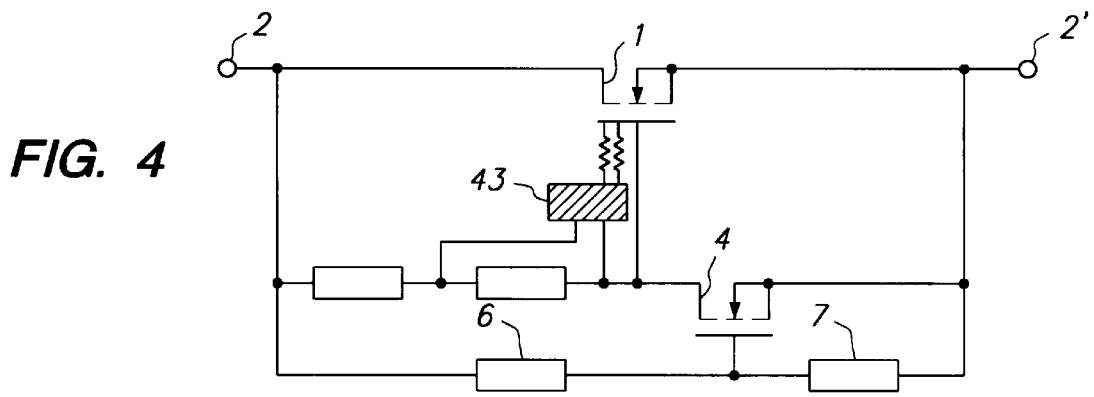
FIGS. 4 and 5 are circuit diagrams of further forms of arrangement according to the invention that employ different voltage sources.

FIG. 4 shows a similar arrangement to that shown in FIG. 3 in which the gate voltage of switching transistor 1 is controlled by control transistor 4 whose gate voltage is set by a voltage divider formed from resistors 6 and 7 that span the switching transistor 1.

In this arrangement the gate of the switching transistor is connected to its drain via a Seebeck device 43 that is in thermal contact with the switching transistor 1 so that any heat generated in the switching transistor will cause a temperature difference between the junctions of the Seebeck device.

In operation, when current first flows along the circuit line, the switching transistor is cold and no voltage is generated by the Seebeck device 43 so that an initial voltage drop of 1 to 2 volts occurs across the switching transistor 1 as shown in FIG. 2 curve B. However, the heat generated in the switching transistor 1 by virtue of this voltage drop will cause a voltage to be generated by the Seebeck device 43 which will bias the switching transistor's gate toward its drain and so reduce the voltage drop across the switching transistor. Thus, a feedback mechanism is established that reduces power dissipated in the switching transistor.

As with the arrangement shown in FIG. 3, if an overcurrent occurs the arrangement will switch to its non-conducting state when the voltage drop across the switching transistor 1 is sufficient to raise the gate source voltage of transistor 4 to its threshold value.

In an alternative arrangement the output of the Seebeck device may be connected in parallel with resistor 5, which is preferably being used with a bipolar switching transistor so that sufficient initial base current can be provided. The Seebeck output may instead be connected between the gate and source of the switching transistor.

Figure 5:
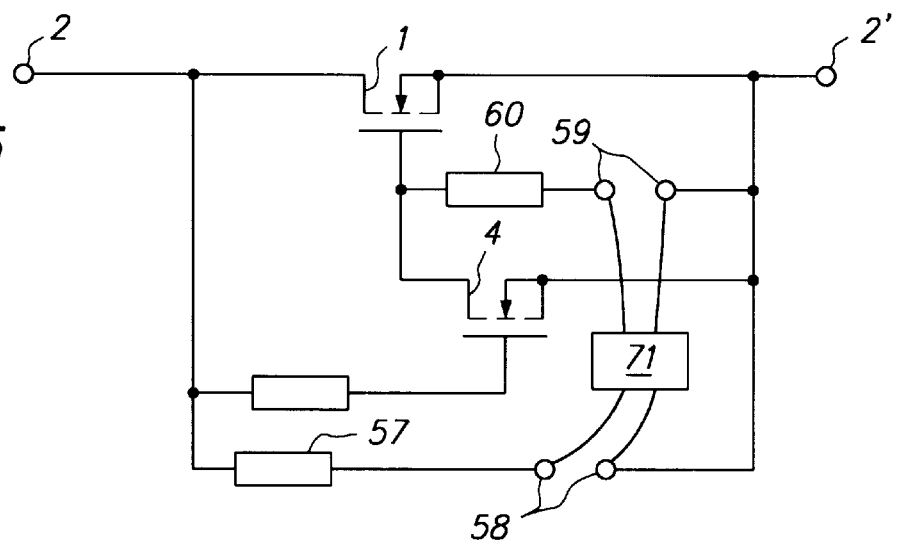

FIG. 5 shows yet another form of arrangement according to the invention. In this arrangement switching transistor 1 is series connected in a line of the circuit and its gate and source are connected together via control transistor 4.

A dc-dc converter is to be included in order to convert 71 a low voltage appearing across the switching transistor 1 or part of that voltage, to a higher voltage to offset the gate of switching transistor 1. The input 58 for the dc-dc converter 71 is between resistor 57 and the source of the transistors 1 and 4, and the output of the dc-dc converter 71 is to be connected at 59, namely between the gate and source of the switching transistor 1, in series with current-limiting resistor 60. It is quite possible, however, to connect the output between the gate and drain of the switching transistor 1.

In use, any voltage that appears across the switching transistor 1 will be multiplied and fed back by the dc-dc converter 71 to offset the gate of switching transistor 1. This has the effect that for all currents up to the trip current the switching transistor has a relatively constant low resistance and has an initial voltage drop ($V_I$ in FIG. 2) of zero volts. Resistor 60 prevents the control transistor 4 in its on state from loading the output 58 for the dc-dc converter 71.

If the arrangement is subject to an overcurrent, it will trip into its high resistance state when the voltage drop across the switching transistor 1' causes the gate source voltage of control transistor 4 to rise to its threshold value, whereupon the current flowing through the switching transistor 1 falls to substantially zero.

This form of arrangement has the advantage that all the components employed are relatively reliable and do not need to be replaced, and in addition, all the components are capable of integration to form a monolithic device.

Figure 6:
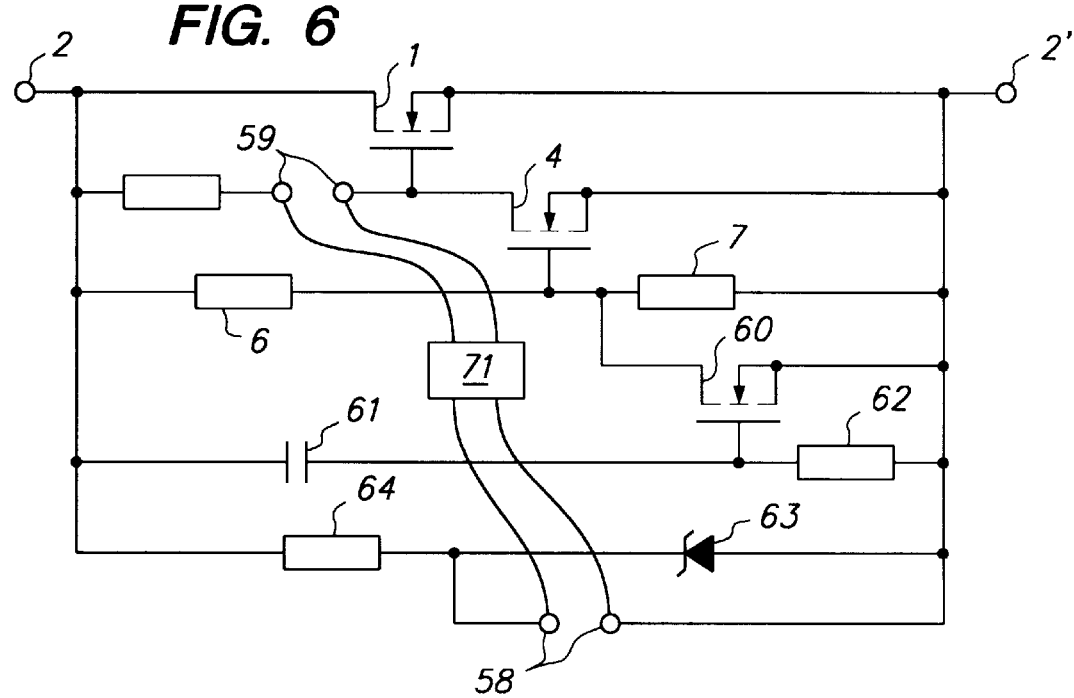
FIG. 6 is a diagram of a modification of the circuit of FIG. 5.
Figure 7:
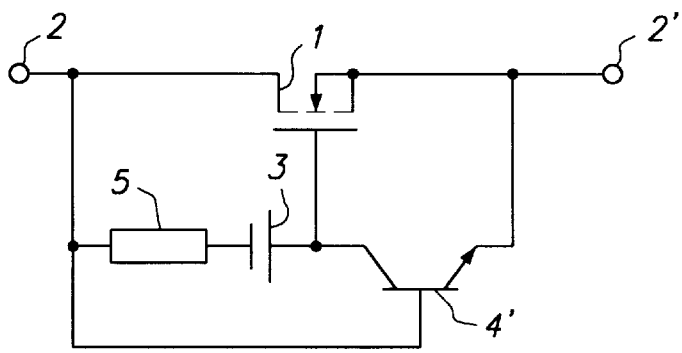

Some dc-dc converters will require a short period of time to generate a voltage output after experiencing a current input. This delay will mean that the control transistor 4 will switch on before the switching transistor 1 and so short out the source gate junction of the switching transistor, thereby causing the circuit to latch in its tripped state as soon as it is switched on. This problem may be overcome by the arrangement as shown in FIG. 6 which incorporates a start-up circuit comprising a FET 60 that is connected across the source and gate terminals of the control transistor 4 and whose gate is held in an RC voltage divider formed by capacitor 61 and resistor 62. When the circuit current is switched on the RC voltage divider acts as a differentiator, causing the gate of FET 60 immediately to go high and then to fall to its source voltage as capacitor 61 charges. FET 60 will therefore initially be on, forcing the control transistor 4 to be off while the dc-dc converter begins to operate.

As shown in FIG. 6 the input for the dc-dc converter is regulated by a Zener diode 63, and a resistor 64 of typically 500Ω will limit the input current to about 2 mA. Alternatively a current limiting diode circuit may be employed in place of the resistor 64 and Zener diode 63.

What is claimed is:

1. A two terminal circuit protection arrangement which:
   (1) is intended to be series connected in a line of a circuit to be protected;
   (2) comprises:
      (a) a series switching transistor which
         i. is selected from bipolar transistors and field effect transistors and
            (i) if it is a bipolar transistor, comprises a collector, an emitter and a base, and
            (ii) if it is a field effect transistor, comprises a drain, a source and a gate, and
         ii. controls the line current;
      (b) a voltage divider which is connected to the source and drain or to the emitter and collector of the switching transistor, and
      (c) a control transistor which
         i. is selected from bipolar transistors and field effect transistors, and
            (i) if it is a bipolar transistor, comprises a collector, an emitter and a base, and
            (ii) if it is a field effect transistor, comprises a drain, a source and a gate,
         ii. has its base or gate voltage determined by the voltage divider,
         iii. controls the base or gate voltage of the switching transistor, and
         iv. is turned on by a voltage across the collector and emitter or source and drain of the switching transistor resulting from an overcurrent through the switching transistor, thereby causing the switching transistor to put the arrangement in a non-conducting state, and (d) a voltage source which is applied to the base or gate of the switching transistor and which biases the switching transistor into or toward conduction in normal operation; and (3) is capable of being reset from the non-conducting state into a conducting state by a remotely controlled interrupting means which interrupts current in the line of the circuit to be protected.

2. An arrangement as claimed in claim 1, wherein the switching transistor and the control transistor are each an enhancement mode field effect transistor.

3. An arrangement as claimed in claim 1, wherein the control transistor is a bipolar transistor and the switching transistor is a field effect transistor.

4. An arrangement as claimed in claim 1, which includes no resistive components in series with the switching transistor.

5. An arrangement as claimed in claim 1, which includes a current limiting resistor in series with the voltage source.

6. An arrangement as claimed in claim 1, wherein the voltage source comprises one or more electrical cells.

7. An arrangement as claimed in claim 1, wherein the voltage source comprises a Seebeck device that is in thermal contact with the switching transistor.

8. An arrangement as claimed in claim 1, wherein the switching transistor or the control transistor is an enhancement mode field effect transistor.

9. A two terminal circuit protection arrangement which:

(1) is intended to be series connected in a line of a circuit to be protected;

(2) comprises:
  (a) a series switching transistor which
    i. is selected from bipolar transistors and field effect transistors and
      (i) if it is a bipolar transistor, comprises a collector, an emitter and a base, and
      (ii) if it is a field effect transistor, comprises a drain, a source and a gate, and
    ii. controls the line current;
  (b) a voltage divider which is connected to the source and drain or to the emitter and collector of the switching transistor, and
  (c) a control transistor which
    i. is selected from bipolar transistors and field effect transistors, and
      (i) if it is a bipolar transistor, comprises a collector, an emitter and a base, and
      (ii) if it is a field effect transistor, comprises a drain, a source and a gate,
    ii. has its base or gate voltage determined by the voltage divider,
    iii. controls the base or gate voltage of the switching transistor, and
    iv. is turned on by a voltage across the collector and emitter or source and drain of the switching transistor resulting from an overcurrent through the switching transistor, thereby causing the switching transistor to put the arrangement in a non-conductive state, and
  (d) a voltage source, comprising a voltage multiplier whose input is taken across the switching transistor, which is applied to the base or gate of the switching transistor and which biases the switching transistor into or toward conduction in normal operation; and (3) is capable of being reset from the non-conducting state into a conducting state by a remotely controlled interrupting means which interrupts current in the line of the circuit to be protected.

10. A two terminal circuit protection arrangement which:

(1) is intended to be series connected in a line of a circuit to be protected;

(2) comprises:
  (a) a series switching transistor which
    i. is selected from bipolar transistors and field effect transistors and
      (i) if it is a bipolar transistor, comprises a collector, an emitter and a base, and
      (ii) if it is a field effect transistor, comprises a drain, a source and a gate, and
    ii. controls the line current;
  (b) a voltage divider which is connected to the source and drain or to the emitter and collector of the switching transistor, and
  (c) a control transistor which
    i. is selected from bipolar transistors and field effect transistors, and
      (i) if it is a bipolar transistor, comprises a collector, an emitter and a base, and
      (ii) if it is a field effect transistor, comprises a drain, a source and a gate,
    ii. has its base or gate voltage determined by the voltage divider,
    iii. controls the base or gate voltage of the switching transistor, and
    iv. is turned on by a voltage across the collector and emitter or source and drain of the switching transistor resulting from an overcurrent through the switching transistor, thereby causing the switching transistor to put the arrangement in a non-conductive state, and
  (d) a voltage source, comprising a voltage multiplier whose input is taken from one or more electrical cells or a Seebeck device, which is applied to the base or gate of the switching transistor and which biases the switching transistor into or toward conduction in normal operation; and (3) is capable of being reset from the non-conducting state into a conducting state by a remotely controlled interrupting means which interrupts current in the line of the circuit to be protected.

11. An electrical circuit which comprises a circuit voltage or current source, a load and a current-carrying line connecting the source and load, the circuit including a two terminal circuit protection arrangement which:

(1) is series connected in the current-carrying line;

(2) comprises:
  (a) a series switching transistor which
    i. is selected from bipolar transistors and field effect transistors and
      (i) if it is a bipolar transistor, comprises a collector, an emitter and a base, and
      (ii) if it is a field effect transistor, comprises a drain, a source and a gate, and
    ii. controls the line current;
  (b) a voltage divider which is connected to the source and drain or to the emitter and collector of the switching transistor, and
  (c) a control transistor which
    i. is selected from bipolar transistors and field effect transistors and (i) if it is a bipolar transistor comprises a collector, an emitter and a base, and
(ii) if it is a field effect transistor comprises a drain, a source and a gate,
ii. has its base or gate voltage determined by the voltage divider,
iii. controls the base or gate voltage of the switching transistor, and
iv. is turned on by a voltage across the collector and emitter or source and drain of the switching transistor resulting from an overcurrent through the switching transistor, thereby causing the switching transistor to put the arrangement in a non-conducting state, and
(d) a voltage source applied to the base or gate of the switching transistor which biases the switching transistor into or toward conduction in normal operation; and
(3) is capable of being reset from the non-conducting state into a conducting state by a remotely controlled interrupting means which disconnects the circuit voltage or current sources, or the load, from the electrical circuit.

12. The electrical circuit as claimed in claim 11, wherein the switching transistor and the control transistor are each an enhancement mode field effect transistor.

13. The electrical circuit as claimed in claim 11, wherein the control transistor is a bipolar transistor and the switching transistor is a field effect transistor.

14. The electrical circuit as claimed in claim 11, wherein the switching transistor or the control transistor is an enhancement mode field effect transistor.

15. The electrical circuit as claimed in claim 11, wherein the circuit protection arrangement includes no resistive components in series with the switching transistor.

16. The electrical circuit as claimed in claim 11, wherein the voltage source comprises a voltage multiplier whose input is taken across the switching transistor.

17. A two terminal circuit protection arrangement which:
(1) is intended to be series connected in a line of a circuit to be protected;
(2) comprises:
(a) a series switching transistor which
i. is selected from bipolar transistors and field effect transistors and
(i) if it is a bipolar transistor, comprises a collector, an emitter and a base, and
(ii) if it is a field effect transistor, comprises a drain, a source and a gate, and
ii. controls the line current;
(b) a control transistor which
i. is selected from bipolar transistors and field effect transistors, and
(i) if it is a bipolar transistor, comprises a collector, an emitter and a base, and
(ii) if it is a field effect transistor, comprises a drain, a source and a gate,
ii. controls the base or gate voltage of the switching transistor, and
iii. is turned on by a voltage across the collector and emitter or source and drain of the switching transistor resulting from an overcurrent through the switching transistor, thereby causing the switching transistor to put the arrangement in a non-conducting state, and
(c) a voltage source which
i. comprises a voltage multiplier whose input is taken across the switching transistor, and
ii. is applied to the base or gate of the switching transistor and which biases the switching transistor into or toward conduction in normal operation; and
(3) is capable of being reset from the non-conducting state into a conducting state by a remotely controlled interrupting means which interrupts current in the line of the circuit to be protected.

18. The circuit protection arrangement as claimed in claim 17, wherein the switching transistor and the control transistor are each an enhancement mode field effect transistor.

19. The circuit protection arrangement as claimed in claim 18, wherein the gate of the control transistor is connected directly to the drain of the switching transistor so that the arrangement will trip if the overcurrent voltage drop across the switching transistor exceeds the threshold voltage of the control transistor.

20. The circuit protection arrangement as claimed in claim 17, wherein the base or gate voltage of the control transistor is determined by a voltage divider which spans the switching circuit.

21. The electrical circuit as claimed in claim 17, wherein the control transistor is a bipolar transistor and the switching transistor is a field effect transistor.

22. The electrical circuit as claimed in claim 17, wherein the switching transistor or the control transistor is an enhancement mode field effect transistor.

23. The electrical circuit as claimed in claim 17, wherein the circuit protection arrangement includes no resistive components in series with the switching transistor.

24. An electrical circuit which comprises a circuit voltage or current source, a load and a current-carrying line connecting the source and load, the circuit including a two terminal circuit protection arrangement which:
(1) is series connected in the current-carrying line;
(2) comprises:
(a) a series switching transistor which
i. is selected from bipolar transistors and field effect transistors and
(i) if it is a bipolar transistor, comprises a collector, an emitter and a base, and
(ii) if it is a field effect transistor, comprises a drain, a source and a gate, and
ii. controls the line current;
(b) a control transistor which
i. is selected from bipolar transistors and field effect transistors and
(i) if it is a bipolar transistor, comprises a collector, an emitter and a base, and
(ii) if it is a field effect transistor, comprises a drain, a source and a gate, and
ii. controls the base or gate voltage of the switching transistor, and
iii. is turned on by a voltage across the collector and emitter or source and drain of the switching transistor resulting from an overcurrent through the switching transistor, thereby causing the switching transistor to put the arrangement in a non-conducting state, and
(c) a voltage source which
i. comprises a voltage multiplier whose input is taken across the switching transistor, and
ii. is applied to the base or gate of the switching transistor and which biases the switching transistor into or toward conduction in normal operation; and (3) is capable of being reset from the non-conducting state into a conducting state by a remotely controlled interrupting means which disconnects the circuit voltage or current source, or the load, from the electrical circuit.

25. The circuit protection arrangement as claimed in claim 24, wherein the switching transistor and the control transistor are each an enhancement mode field effect transistor.

26. The circuit protection arrangement as claimed in claim 25, wherein the gate of the control transistor is connected directly to the drain of the switching transistor so that the arrangement will trip if the overcurrent voltage drop across the switching transistor exceeds the threshold voltage of the control transistor.

27. The circuit protection arrangement as claimed in claim 24, wherein the base or gate voltage of the control transistor is determined by a voltage divider which spans the switching circuit.

28. The electrical circuit as claimed in claim 24, wherein the control transistor is a bipolar transistor and the switching transistor is a field effect transistor.

29. The electrical circuit as claimed in claim 24, wherein the switching transistor or the control transistor is an enhancement mode field effect transistor.

30. The electrical circuit as claimed in claim 24, wherein the circuit protection arrangement includes no resistive components in series with the switching transistor.

* * * * *